(12) United States Patent
Choi

(10) Patent No.: US 8,044,918 B2
(45) Date of Patent: Oct. 25, 2011

(54) BACK LIGHT APPARATUS AND CONTROL METHOD THEREOF

(75) Inventor: Hoon Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 11/874,268

(22) Filed: Oct. 18, 2007

(65) Prior Publication Data

US 2008/0129223 A1 Jun. 5, 2008

(30) Foreign Application Priority Data

Dec. 4, 2006 (KR) ........................ 10-2006-0121780

(51) Int. Cl.
*G09G 3/38* (2006.01)
(52) U.S. Cl. ......................................... 345/102; 345/87
(58) Field of Classification Search .................. 345/87, 345/82, 83, 102; 349/65
See application file for complete search history.

(56) References Cited

U.S. PATENT DOCUMENTS

| | | | |
|---|---|---|---|
| 6,608,614 B1 | 8/2003 | Johnson | |
| 2005/0073845 A1 | 4/2005 | Matsui | |
| 2005/0110740 A1 | 5/2005 | Linzmeier et al. | |
| 2006/0125773 A1 | 6/2006 | Ichikawa et al. | |
| 2007/0115228 A1* | 5/2007 | Roberts et al. | .................. 345/82 |
| 2008/0007182 A1* | 1/2008 | Deurenberg et al. | ......... 315/149 |
| 2008/0245949 A1* | 10/2008 | Morimoto et al. | ............ 250/205 |

FOREIGN PATENT DOCUMENTS

| | | |
|---|---|---|
| CN | 1776497 A | 5/2006 |
| EP | 1 152 642 | 11/2001 |
| EP | 1 675 097 A2 | 6/2006 |
| JP | 2002-214825 A | 8/2000 |
| JP | 2004-309509 A | 11/2004 |
| KR | 10-2005-0022011 A | 3/2005 |
| KR | 10-2006-0056243 A | 5/2006 |
| WO | 03/037042 A1 | 5/2003 |

OTHER PUBLICATIONS

Decision to Refuse issued Jun. 14, 2011 in counterpart European Patent Application No. 07116966.8.

* cited by examiner

*Primary Examiner* — Ricardo L Osorio
(74) *Attorney, Agent, or Firm* — Sughrue Mion, PLLC

(57) ABSTRACT

A back light apparatus includes a back light part which emits light to a liquid crystal display panel, and includes a plurality of LEDs respectively corresponding to a plurality of colors, a detecting part which detects the light emitted from the plurality of the LEDs, a driving part which drives the LEDs to emit, and a controller which controls the driving part to make color ratios substantially equal to a reference value if the reference value is not equal to the color ratio between at least two colors among the plurality of colors of the light detected in the detecting part.

20 Claims, 4 Drawing Sheets

BACK LIGHT APPARATUS AND CONTROL METHOD THEREOF

CROSS-REFERENCE TO RELATED APPLICATIONS

This application claims priority from Korean Patent Application No. 2006-0121780, filed on Dec. 4, 2006 in the Korean Intellectual Property Office, the disclosure of which is incorporated herein by reference.

BACKGROUND OF INVENTION

1. Field of Invention

Apparatuses and methods consistent with the present invention relate to a back light apparatus and a control method thereof, and more particularly, to a back light apparatus which uses light emitting diodes (LEDs) of various colors as a light source, and a control method thereof

2. Description of the Related Art

In the related art back light apparatus using an LED as a light source, a red LED (R LED), a green LED (G LED) and a blue LED (B LED) respectively have different lighting efficiencies. Accordingly, currents to be supplied to the LEDs for respective colors are different from one another. Also, the LEDs for different colors are receive different voltages and consume different power because they are different from one another in semiconductor composition.

The back light apparatus using the R LED, the G LED and the B LED as a light source optically mixes lights of different colors to generate predetermined chromaticity corresponding to a white light. For this, the back light apparatus detects the amount of the lights of the respective colors by a red light sensor, a green light sensor and a blue light sensor, and adjusts the currents supplied to the respective LEDs based on feedback control. Accordingly, the back light apparatus adjusts the predetermined chromaticity to the white light by mixing the red light, the green light and the blue light.

The related art back light apparatus having the LEDs as the light source previously calculates the initial amounts of the currents (for example, Pulse Width Modulation (PWM) duty rate) of the respective red light, green light and blue light, and drives the LEDs of respective colors based on the initial amounts of the currents just after power is supplied to the related art back light apparatus.

However, the lighting efficiency decreases if time is passed. Thus, though the currents having maximum values are supplied to the respective R LED, G LED and B LED, the respective LEDs may not present corresponding brightness. Accordingly, the back light apparatus cannot control the LEDs based on the brightness generated by the current having the maximum value. In other words, if the back light apparatus controls the brightness of the LED based on the output of the LED, the brightness is not correctly adjusted because the output is changed depending on deterioration of the LED.

Also, if the brightness of the light source should be controlled per frame unit, it is not desirable to control the brightness while changing an output reference of the sensor per the frame unit, and it is practically difficult to be controlled by this method.

SUMMARY OF THE INVENTION

The present invention provides a back light apparatus capable of controlling a color without changing an output reference of a light sensor and in optimum brightness despite deterioration of a light source if the back light apparatus uses LEDs corresponding to a plurality of colors, and a control method thereof.

According to an aspect of the present invention, there is provided a back light apparatus comprising: a back light part which emits light to a liquid crystal display panel and comprises a plurality of LEDs respectively corresponding to a plurality of colors; a detecting part which detects the light emitted from the plurality of the LEDs; a driving part which drives the LEDs to emit; and a controller which controls the driving part to make color ratios be equal to a reference value if the reference value is not equal to the color ratio between at least two colors among the plurality of colors of the light detected in the detecting part.

The plurality of LEDs may comprise red, green and blue LEDs.

The controller may control the driving part to adjust a current input to the LEDs so that the color ratio between two colors becomes a value.

The controller controls the driving part to adjust the current input to an LED for one of two colors so that the color ratio becomes the value.

The controller may control the driving part to adjust the current input to an LED for one of two colors so that the color ratio becomes the value if the current input to an LED of the other of two colors reaches the maximum level.

The controller may control the driving part to adjust PWM of the current input to the LEDs so that the color ratio between two colors becomes the value.

The detecting part may comprise a photo diode.

According to another aspect of the present invention, there is provided a control method of a back light apparatus which emits light to a liquid crystal display panel and comprises a plurality of LEDs respectively corresponding to a plurality of colors, comprising: detecting the plurality of colors of the light emitted from the plurality of the LEDs; calculating a color ratio between at least two colors among the detected colors; and adjusting brightness of the LEDs to make the color ratio be equal to a reference value if the reference value is not equal to the calculated color ratio.

The plurality of LEDs may comprise red, green and blue LEDs.

The adjusting of the color ratio between two colors may comprise adjusting the current input to the LEDs.

The adjusting of the color ratio between two colors may comprise adjusting the current input to an LED for one of two colors.

The adjusting of the color ratio between two colors may comprise adjusting the current input to an LED for one of two colors if the current input to an LED for the other of two colors reaches the maximum level.

The adjusting of the ratio between two colors may comprise adjusting PWM of the current input to the LEDs.

The LEDs may comprise a photo diode.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
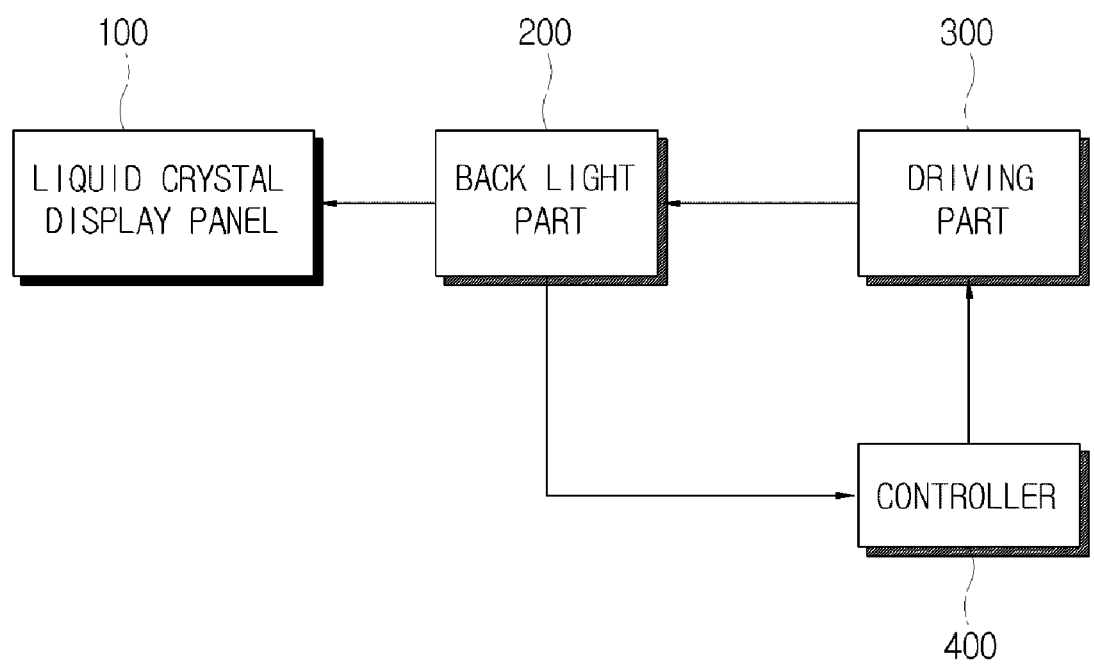
FIG. 1 is a control block diagram of a liquid crystal display apparatus according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a liquid crystal display apparatus includes a liquid crystal display panel 100, a back light part 200, a driving part 300 and a controller 400. The liquid crystal display panel 100 includes a first substrate on which a switching element (not shown) and a pixel electrode (not shown) are formed; a second substrate on which a red color filter, a green color filter and a blue color filter are formed; and a liquid crystal between the first substrate and the second substrate. A signal from a panel driving part (not shown) is transmitted to the switching element through a Printed Circuit Board (PCB) provided on a source side of the first substrate and a PCB provided on a gate side thereof Then, the liquid crystal receives an electric signal so that the liquid crystal display panel 100 displays an image by penetrating or intercepting light from the back light part 200 (as described below) or by adjusting the amount of the light that penetrates therethrough.

The back light part 200 includes a plurality of light emitting elements to emit the light of various colors. The light emitting element according to an exemplary embodiment includes a Light Emitting Diode (LED). Herein, the light emitting diode may includes a red LED (R LED) which emits the light of red color, a green LED (G LED) which emits the light of green color and a blue LED (B LED) which emits the light of blue color. The light source generates a white light by mixing the red light, the green light and the blue light and transmits the white light to the liquid crystal display panel 100.

The back light part 200 includes a detector which detects the light from the respective light emitting diodes. Herein, the detector may be embodied with a photo sensor, for example but not by way of limitation, a photo diode. The light sensor output an analog signal by itself Alternatively, a separated analog/digital converter (ADC) may be provided for outputting the signal.

The driving part 300 transits on/off the respective LEDs (R LED, G LED and B LED) and adjusts intensity of the light from the LEDs according to controlling of the controller 400 (to be described later). Herein, the driving part 300 adjusts intensity of currents which are supplied to the respective LEDs (R LED, G LED and B LED) according to controlling of the controller 400. Then, the intensity of the light from the LEDs of respective colors (R LED, G LED and B LED) is adjusted to adjust a color of the image displayed on the liquid crystal display panel 100.

The controller 400 controls the driving part 300 to adjust the current supplied to one of the LEDs so that a reference value which is previously stored becomes equal to a color ratio of the light of two colors from LEDs detected by the light sensor.

If the signals from the light sensor are R, G and B, the signals and reference color coordinates X, Y and Z are capable of being transformed into Formula 1 as follows.

$$\begin{bmatrix} X \\ Y \\ Z \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix} \quad \text{[Formula 1]}$$

Herein, if only color is expressed, it is usually defined as x and y and brightness is not considered. Accordingly, the following Formula 2 can be defined.

$$x = \frac{X}{X+Y+Z} \quad \text{[Formula 2]}$$
$$y = \frac{y}{X+Y+Z}$$

Herein, if the x and y are maintained, only the color of the light can be maintained, so that the Formula 2 is rearranged with regard to R, G and B by the Formula 1.

$$y = \frac{Y}{X+Y+Z} = \frac{a21R + a22G + a23B}{m1R + m2G + m3B} = \quad \text{[Formula 3]}$$
$$\frac{a21R/G + a22 + a23B/G}{m1R/G + m2 + m3B/G}$$
$$x = \frac{X}{X+Y+Z} = \frac{a11R + a12G + a13B}{m1R + m2G + m3B} =$$
$$\frac{a11R/G + a12 + a13B/G}{m1R/G + m2 + m3B/G}$$

(Herein, $m1 = a11 + a21 + a31$, $m2 = a12 + a22 + a32$,
$$m3 = a13 + a23 + a33)$$

Feedback control may be performed to make a value of a chromaticity substantially constant. For example, if the amount of the current for the G LED among three types of the currents, which are supplied to the R, G and B LEDs, is adjusted to change the green light, the red and blue lights are influenced because of a property of green color which is overlapped by the red color and the blue color in a color spectrum. Accordingly, the controller 400 according to an exemplary embodiment fixes the level of the current supplied to the G LED and changes the level of the current supplied to the LED for different colors (i.e., green color and blue color) to adjust the chromaticity to have a constant value.

According to an exemplary embodiment, the controller 400 receives the amount of the light detected in the light sensor and calculates the color ratio of two colors. Herein, the description will be given with regard to calculating the ratios of the red and blue light to the green light by way of example. In other words, the controller 400 calculates R/G and B/G if the amounts of red, green and blue light are detected. Herein, the controller 400 compares a reference color ratio which is previously stored with the calculated ratio of colors. Herein, the reference color ratio is a ratio for an objective amount of the light from the respective LEDs to generate a reference color.

Figure 2:
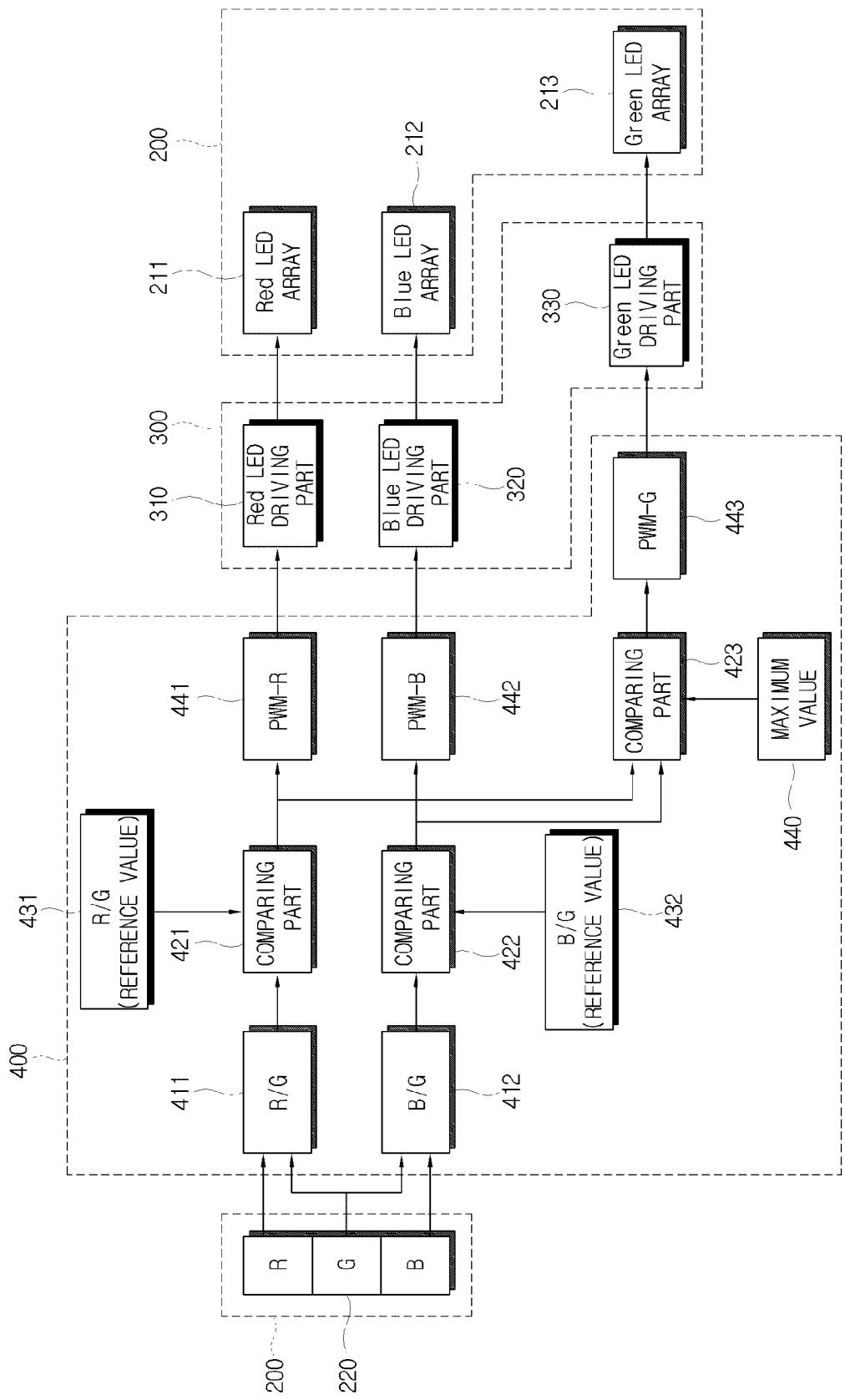
FIG. 2 illustrates a configuration of a liquid crystal display apparatus according to an exemplary embodiment of the present invention.

As shown in FIG. 2, if the amounts of the light from the R, G and B LEDs are detected through a sensing part 220 provided in the back light part 200, an R/G calculating part 411 and a B/G calculating part 412 in the controller 400 calculate the color ratios of the amounts of the light from R and B LEDs with respect to the G LED. Meanwhile, the calculated color ratios are compared with the reference values from an R/G reference value 431 and a B/G reference value 432 in comparing blocks 421 and 422. According to the comparing result, if the calculated R/G value is higher than the reference R/G value, the controller 400 adjusts a PWM through a PWM-R 441 to reduce the current input to the R LED, and if the calculated R/G value is lower than the reference R/G value, the controller 400 adjusts the PWM by the PWM-R 441 to increase the current input to the R LED.

The foregoing operation is substantially equivalent to an operation in a PWM-B 442 and the comparing block 422 which compares the calculated B/G value and the reference B/G value.

The controller 400 compares the PWM which is currently input in a comparing part 423 with a PWM maximum value which is stored in a maximum value storing part 440 of the R LED and B LED and is the maximum value capable of being input to the R LED and B LED. Next, the controller 400 adjusts the PWM input to the G LED by a PWM-G 443 to make the color ratio of the R/G and B/G BE substantially equal to the reference value.

The liquid crystal display apparatus according to the exemplary embodiment is capable of dimming to adjust the brightness of the LED according to a condition.

Figure 3:
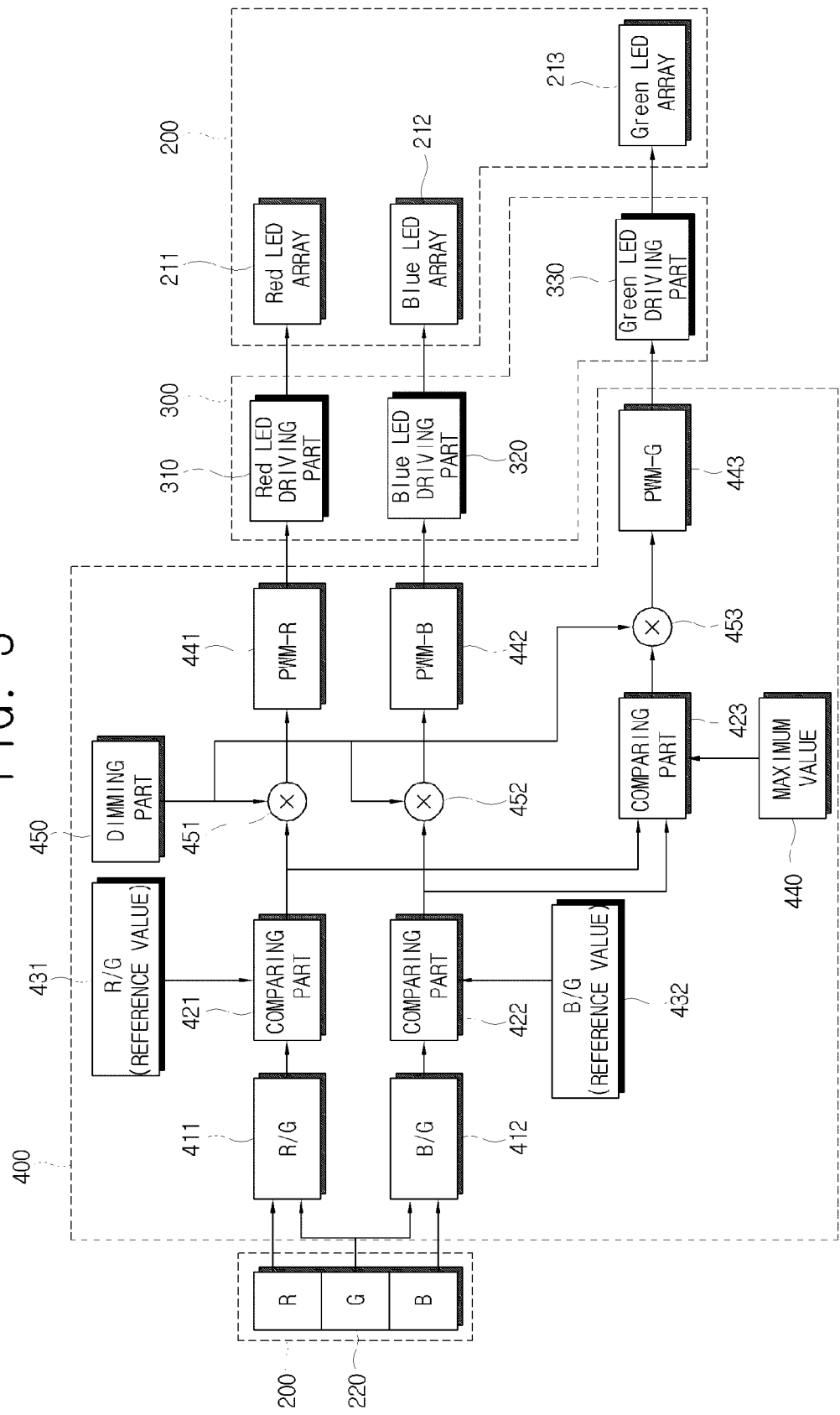
FIG. 3 illustrates a configuration for local dimming of a liquid crystal display apparatus according to an exemplary embodiment of the present invention.

As shown in FIG. 3, the controller 400 adjusts a relative brightness which is displayed on the liquid crystal panel 100. Specifically, adjusting parts 451, 452 and 453 of the controller 400 outputs PWM which has a ratio to adjust the brightness to the PWM-R 441, PWM-B 442 and PWM-G 443 based on a received ratio from the dimming part 450 in the controller 400. In other words, the controller 400 compares the calculated ratios of the R/G and B/G with the reference color ratio and makes the calculated ratios equal to the reference color ratio by the adjusting parts 451, 452 and 453 so as to make the value of the brightness substantially constant.

Figure 4:
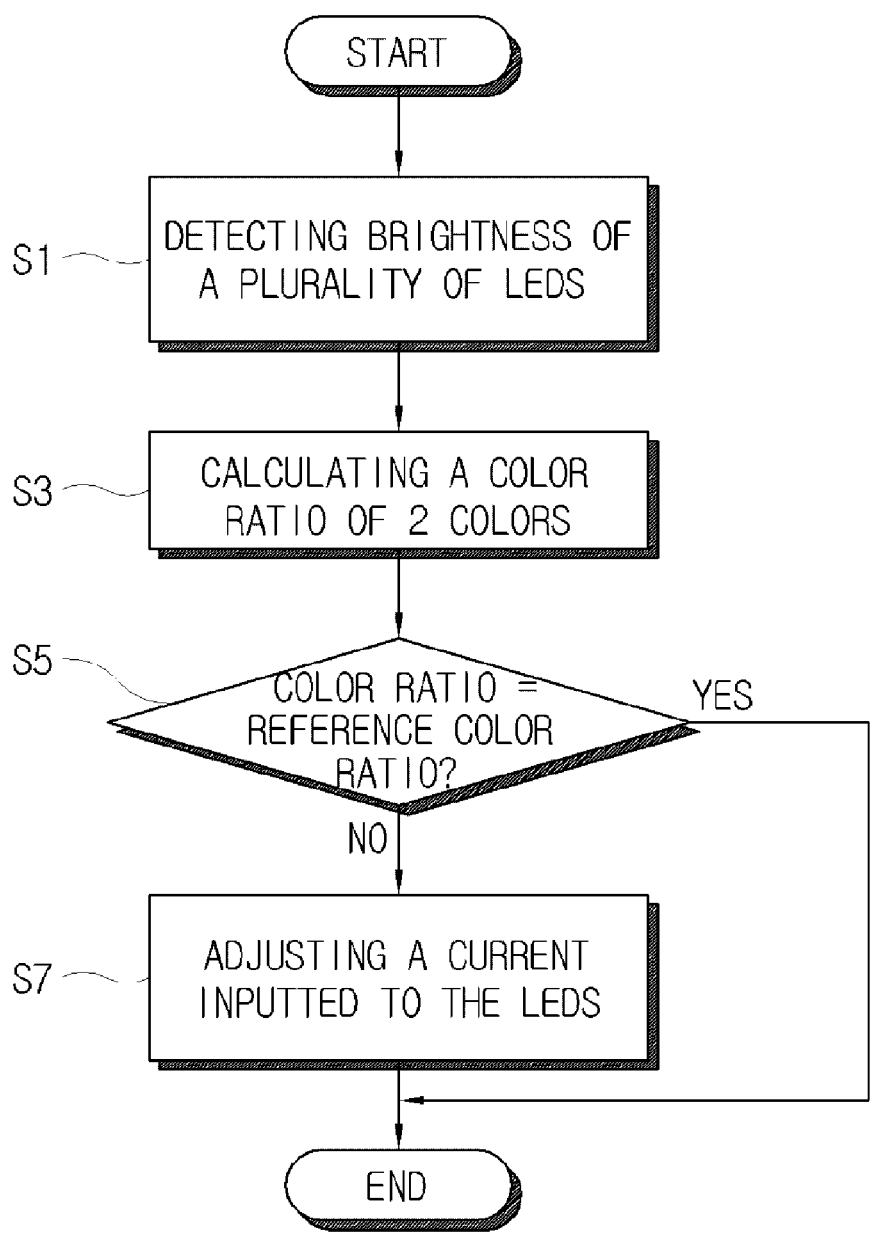
FIG. 4 is a control flow chart of a liquid crystal display apparatus according to an exemplary embodiment of the present invention.

Hereinafter, the operation of the liquid crystal display apparatus according to an exemplary embodiment is described by referring to FIG. 4 as follows.

First, the light sensor provided in the back light part 200 detects the brightness of the plurality of LEDs at operation S1. In this exemplary embodiment, the liquid crystal display apparatus detects the amount of the light of the respective R, G and B LEDs and represents the detected light amounts as R, G and B colors by way of example.

Next, the controller 400 calculates the color ratio of the R, G and B at operation S3. For example, the color ratios may be ratios of R and B to G, in other words R/G and B/G. Here, the detected color is a maximum value which the respective current LEDs are capable of expressing. In other words, if the R LED is detected as "90", the G LED is detected as "100" and the B LED is detected as "80", R/G is "0.9" and B/G is "0.8".

The controller 400 compares the calculated color ratio with the reference color ratio which is previously stored at operation S5. As a result of comparison, if the calculated color ratio is not equal to the reference color ratio, the controller 400 controls the driving part 300 to adjust the current input to the LED at operation S7. Herein, the reference color ratio is the R/G and B/G corresponding to the objective amount of the light of the R, G and B LEDs. If the objective amounts of the light for the R, G and B LEDs are "100," "100" and "100," respectively 100, R/G=1 and B/G=1. Because the calculated R/G is "0.9," the controller 400 increases the PWM of the R LED so that R/G gets "1." Also, because the calculated B/G is "0.8," the controller 400 increases the PWM of the B LED so that B/G gets "1."

Then, the controller 400 may adjust the PWM of the G LED to adjust R/G and B/G if the value of the current input to the R LED and/or B LED which adjusts the PWM gets the maximum value of the current which is previously stored. In other words, the controller 400 increases the PWM of the G LED if the R/G and B/G is higher than the reference value, and the controller 400 decreases the PWM of the G LED if the R/G and B/G is lower than the reference value to adjust the color ratio.

According to the foregoing configuration, the liquid crystal display apparatus according to an exemplary embodiment is capable of driving the respective LEDs at the maximum brightness while the objective color is maintained according to adjusting the color ratios between the red, green and blue colors.

The above embodiment describes that the R/G and B/G are compared with the reference value with respect to G when the color ratios of the R, G and B LEDs are compared one another but it is only example of the present invention and it is not limited. Also, the reference color and the color to adjust the PWM can be any of red, green and blue colors.

As described above, a back light apparatus and a control method thereof are provided, which controls the PWM according to the color ratio of the light from the respective LEDs detected in the light sensor, thereby controlling the color without changing the reference value with respect to outputting of the light sensor and controlling the color in the optimum brightness despite deterioration of the light source. Accordingly, if the LEDs for the plurality of colors are used as the light source, the LEDs for some colors are controlled to facilitate color control and adjustment of the relative brightness while maintaining color coordinates.

The exemplary embodiment is described above with reference to a flowchart illustration. It should be understood that each block of the flowchart illustration can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause operational steps to be performed in the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). In some alternative implementations, the functions noted in the blocks may occur out of the illustrated order without departing from the scope of the invention. For example, two blocks shown in succession may in fact be executed substantially concurrently or in reverse order, depending upon the functionality involved.

Although exemplary embodiments have been disclosed, it will be appreciated by those skilled in the art that changes may be made in these exemplary embodiments without departing from the principles and spirit of the invention, the scope of which is defined in the appended claims and their equivalents.

What is claimed is:

1. A back light apparatus comprising:
   a back light part which emits light to a liquid crystal display panel, the back light part comprising a plurality of light emitting diodes (LEDs) respectively corresponding to a plurality of colors;
   a detecting part which detects the light emitted by the plurality of the LEDs;
   a driving part which drives the plurality of the LEDs to generate an emission; and
   a controller which controls the driving part to make a color ratio between two colors of the plurality of colors of the light detected in the detecting part substantially equal a reference value if the reference value does not equal the color ratio between the two colors of the plurality of colors of the light detected in the detecting part.

2. The back light apparatus according to claim 1, wherein the plurality of LEDs comprises red LEDs, green LEDs and blue LEDs.

3. The back light apparatus according to claim 1, wherein the controller controls the driving part to adjust current inputs to LEDs for the two colors so that the color ratio between the two colors becomes a value.

4. The back light apparatus according to claim 1, wherein the controller controls the driving part to adjust a current input to an LED for one of the two colors so that the color ratio becomes a value.

5. The back light apparatus according to claim 4, wherein the controller controls the driving part to adjust a current input to an LED for the other color of the two colors so that the color ratio becomes the value if the current input to an LED of the one color of the two colors reaches a maximum level.

6. The back light apparatus according to claim 4, wherein the controller controls the driving part to adjust pulse width modulation (PWM) of the current input to the LED for the one color so that the color ratio between the two colors becomes the value.

7. The back light apparatus according to claim 1, wherein the detecting part comprises a photo diode.

8. A control method of a back light apparatus which emits light to a liquid crystal display panel and comprises a plurality of light emitting diodes (LEDs) respectively corresponding to a plurality of colors, the control method comprising:
   detecting the plurality of colors of the light emitted from the plurality of the LEDs;
   calculating a color ratio between two colors of the plurality of detected colors; and
   adjusting a brightness of the LEDs to make the color ratio between the two colors equal a reference value if the reference value does not equal the calculated color ratio.

9. The control method of the back light apparatus according to claim 8, wherein the plurality of LEDs comprises red LEDs, green LEDs and blue LEDs.

10. The control method of the back light apparatus according to claim 8, wherein the adjusting of the color ratio between the two colors comprises adjusting current inputs to LEDs for the two colors.

11. The control method of the back light apparatus according to claim 8, wherein the adjusting of the color ratio between the two colors comprises adjusting a current input to an LED for one color of the two colors.

12. The control method of the back light apparatus according to claim 11, wherein the adjusting of the color ratio between the two colors comprises adjusting a current input to an LED for the other color of the two colors if the current input to an LED for the one color of the two colors reaches a maximum level.

13. The control method of the back light apparatus according to claim 11, wherein the adjusting of the ratio between the two colors comprises adjusting pulse width modulation (PWM) of a current input to the LED for the one color.

14. The control method of the back light apparatus according to claim 8, wherein each of the LEDs comprise a photo diode.

15. A computer readable medium storing a set of instructions for performing a control method of a back light apparatus which emits light to a liquid crystal display panel and comprises a plurality of light emitting diodes (LEDs) respectively corresponding to a plurality of colors, the method comprising:
   detecting the plurality of colors of the light emitted from the plurality of the LEDs;
   calculating a color ratio between two colors of the plurality of detected colors; and
   adjusting a brightness of the LEDs so that the color ratio equals a reference value if the reference value does not equal the calculated color ratio.

16. The computer readable medium according to claim 15, wherein the plurality of LEDs comprises red LEDs, green LEDs and blue LEDs.

17. The computer readable medium according to claim 15, wherein the adjusting of the color ratio between the two colors comprises adjusting current inputs to LEDs for the two colors.

18. The computer readable medium according to claim 15, wherein the adjusting of the color ratio between the two colors comprises adjusting a current input to an LED for one color of the two colors.

19. The computer readable medium according to claim 18, wherein the adjusting of the color ratio between the two colors comprises adjusting a current input to an LED for the other color of the two colors if the current input to an LED for the one color of the two colors reaches a maximum level.

20. The computer readable medium according to claim 18, wherein the adjusting of the ratio between two colors comprises adjusting pulse width modulation (PWM) of the current input to the LED for the one color.

* * * * *